Oct. 14, 1952 H. J. VAN DOORNE 2,613,827
SELF-LOADING AND UNLOADING VEHICLE
Filed Aug. 23, 1948 5 Sheets-Sheet 1

INVENTOR.
HUBERTUS JOSEPHUS VAN DOORNE
BY
Hugh A. Kirk

Oct. 14, 1952 — H. J. VAN DOORNE — 2,613,827
SELF-LOADING AND UNLOADING VEHICLE
Filed Aug. 23, 1948 — 5 Sheets-Sheet 2

INVENTOR.
HUBERTUS JOSEPHUS VAN DOORNE
BY Hugh A. Kirk

INVENTOR.
HUBERTUS JOSEPHUS VAN DOORNE
BY Hugh A Kirk

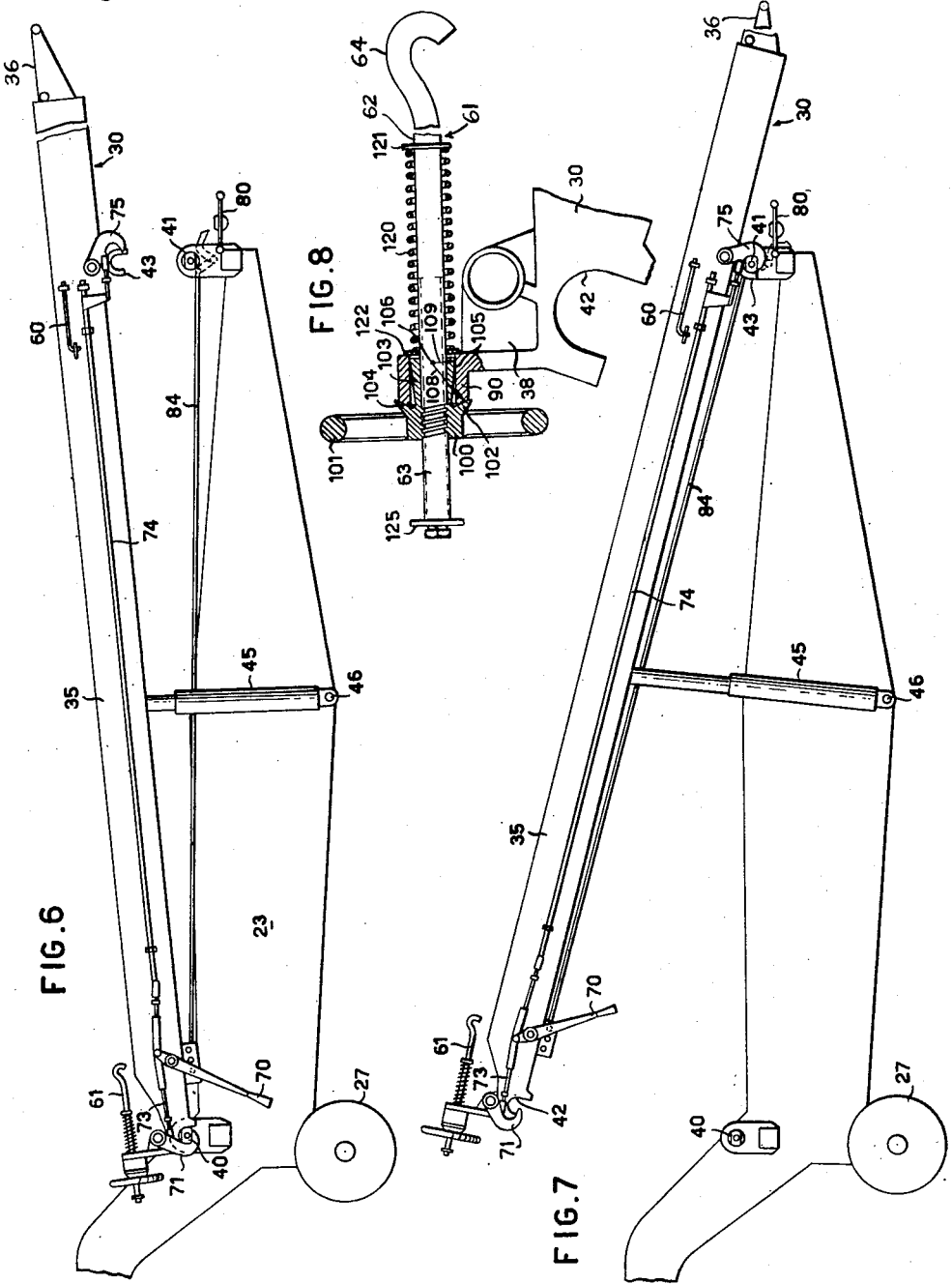

Oct. 14, 1952  H. J. VAN DOORNE  2,613,827
SELF-LOADING AND UNLOADING VEHICLE
Filed Aug. 23, 1948  5 Sheets-Sheet 5
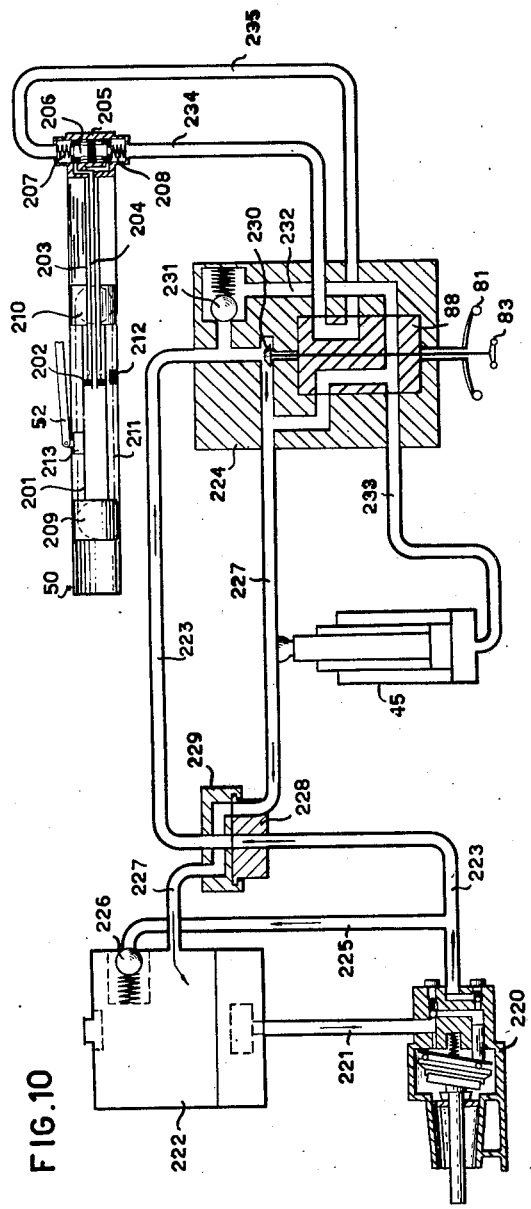
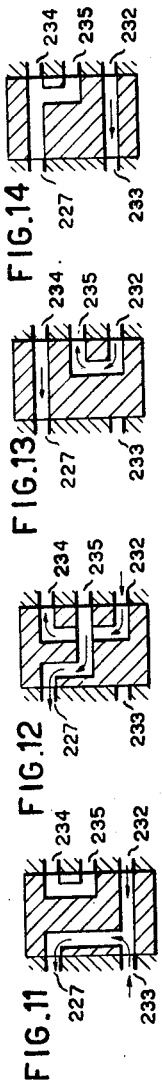
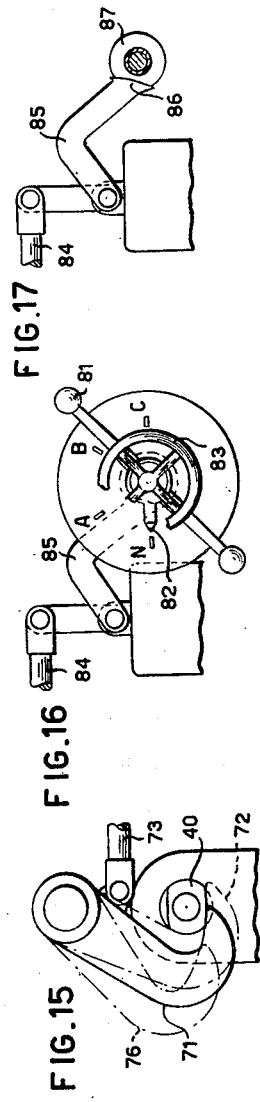
INVENTOR.
HUBERTUS JOSEPHUS VAN DOORNE
BY
Hugh A Kirk Patented Oct. 14, 1952

2,613,827

UNITED STATES PATENT OFFICE 2,613,827

SELF-LOADING AND UNLOADING VEHICLE

Hubertus Josephus van Doorne, Deurne, Netherlands

Application August 23, 1948, Serial No. 45,642
In Belgium September 6, 1947

16 Claims. (Cl. 214—83.12)

This invention relates to a self-loading and unloading vehicle. More particularly, it deals with the control mechanism for such a vehicle. For example in a vehicle for handling special containers such as LCL (less than carload lot) containers between a railway station or railway car and the place where the container is filled or emptied, this invention deals with the mechanism for moving the container onto and off of the vehicle from a railway car, the ground, or a platform; the control of such mechanism; and the locking of the container and the mechanism when the container is in its position to be transported on the vehicle.

It is an object of this invention to provide a new, efficient, effective self-loading and unloading vehicle with a simple, positive, non-jamming, fool-proof control and locking mechanism for the self-loading and unloading equipment on the vehicle.

Another object is to provide improvements over Dutch Patents No. 50,510 and No. 55,777.

In accordance with this invention, the vehicle for transporting a container comprises: a main frame, an auxiliary frame mounted on said main frame to support said container, means to move said container onto and off of said auxiliary frame, means to tilt said auxiliary frame forwardly and backwardly, and means to lock said moving means and said tilting means when said auxiliary frame is in its container carrying position.

In one embodiment of this invention, separate axes are provided at each end of the auxiliary frame which may be both or alternatively engaged to lock or to tilt, respectively, the auxiliary frame forwardly or backwardly about either axis. Two separate manual control devices may be provided, one or the first of which alternately locks either one or both of the tilting axes to the main frame and co-operates with the other or second control device, which other device controls the actual tilting of the auxiliary frame and may also control a pushing and pulling mechanism for moving the container onto or off of the auxiliary frame. This other or second control device is prevented from operating when both axes of the auxiliary frame are locked to the main frame, so that the tilting mechanism for the auxiliary frame as well as the pushing and pulling mechanism cannot then be operated; and correspondingly when the first control device is in a given operating position it cannot be changed into another operating position as long as the second control device is in one of its operating positions. This co-operation between the two control devices prevents jamming of the mechanism and prevents any operator from making an error in their operation which might unexpectedly discharge and/or damage the container.

Furthermore, special universally adjustable clamping devices may be provided on the auxiliary frame for fastening the container into its carrying position. The auxiliary frame tilting mechanism and the pushing and pulling mechanism may comprise fluid pressure or vacuum reciprocating motors, hydraulic pistons, gears and racks or the like, and the second control device may comprise a valve or switch means to control the flow of the fluid or energy for said motors, gears, or racks.

The above mentioned and other features and objects of this invention and the manner of attaining them will become more apparent and the invention itself will be best understood by reference to the following description of an embodiment of the invention taken in conjunction with the accompanying drawings, wherein:

Fig. 6 is a detailed side elevation of the main frame with the auxiliary frame tilted forwardly;

Fig. 7 is similar to Fig. 6 with the auxiliary frame tilted rearwardly;

Fig. 8 is a detailed side view of one of the locking means mounted on the auxiliary frame for holding the container in its carrying position, partly shown in vertical section;

Fig. 10 is a schematic diagram of the hydraulic system of Fig. 9 showing the passages for fluid through the pump and the manual control valve on to the hydraulic motor means;

Figs. 11, 12, 13 and 14 are schematic sections of the control valve core member shown in Fig. 10 in its four different adjustable positions;

Fig. 15 is a detailed view of one of the locking hooks for the tilting axes showing in dot and dash lines the different operating positions thereof;

Fig. 16 is a detail front view of one embodiment of the manual control handles of the control valve in Fig. 10, with parts broken away; and Fig. 17 is a view similar to Fig. 16, with the control handles and dial removed to show the co-operation of the mechanical and the hydraulic control devices or systems.

Figure 1:
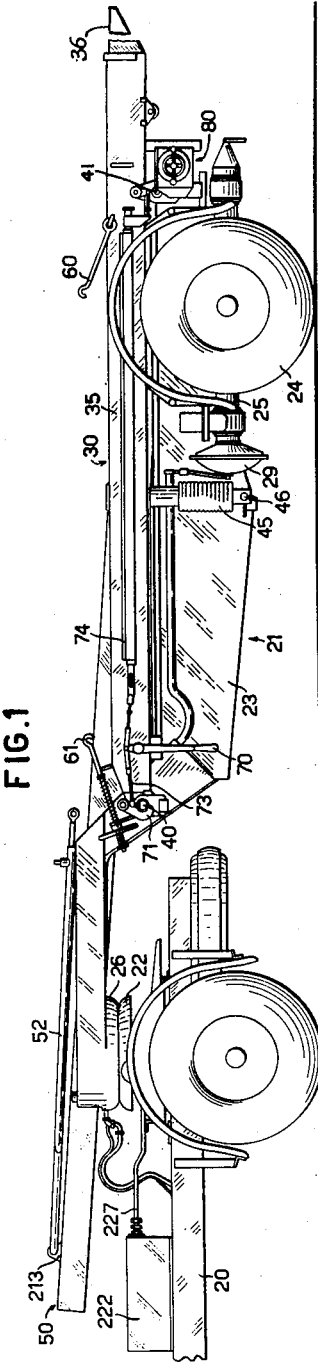
Fig. 1 is a side elevation of a part of a tractor with a semi-trailer showing one embodiment of this invention with the auxiliary frame in its container carrying or transporting position.
Figure 5:
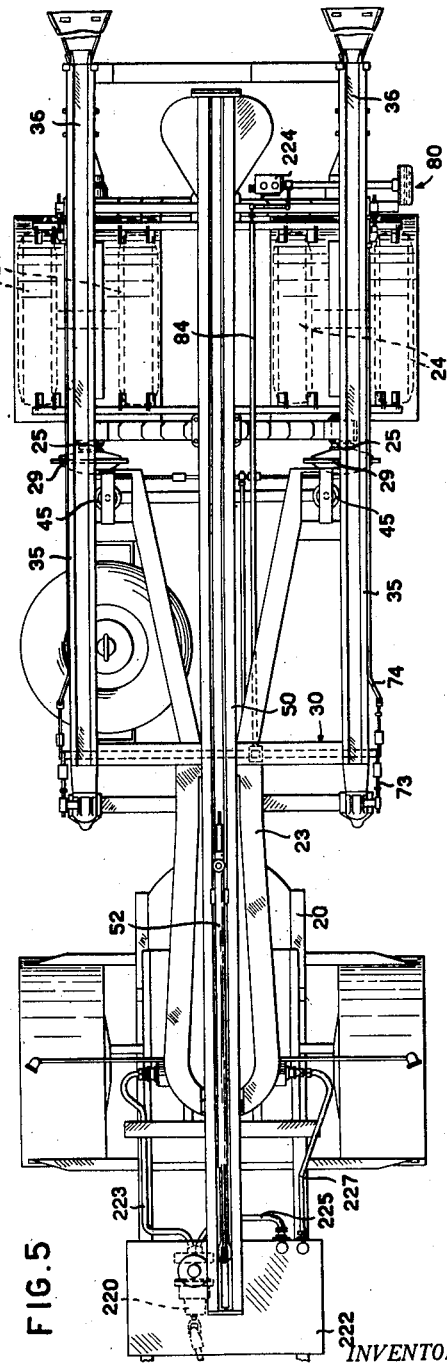
Fig. 5 is a plan view of the part of the tractor and of the semi-trailer shown in Fig. 1.

Referring to Fig. 1 there is shown the rear part of a tractor 20 and the semi-trailer 21 the front end of which rests on the fifth wheel 22 of the tractor 20.

The trailer 21 comprises a main frame 23 mounted on two pairs of rear wheels 24, each of which pairs may be adapted to swivel about a longitudinal axle 25. The front end of the trailer may have a support 26 resting on the fifth wheel 22, and may also have retractable supporting wheels 27, shown in Figs. 2, 3 and 4 but not in Fig. 1 for the sake of clearness, which wheels 27 may be provided with a steering rod 28, shown in its inoperative position in Figs. 2, 3 and 4. On the front ends of the swivel axles 25 may be mounted brake cylinders or diaphragms 29. On top of the main frame 23 is mounted a tiltable auxiliary frame 30 which supports a special container, such as 31 (shown in Figs. 2 and 3) or 32 (shown in Fig. 4).

The containers 31 and 32 are provided with equal axially spaced rollers 33 which roll along the parallel channels or tracks 35 of the auxiliary frame 30. The auxiliary frame 30 may be supported along either one or both of two parallel axes comprising trunnions 40 and 41 mounted on the main frame 23 which engage the semibearings 42 and 43 (see Figs. 6 and 7) near opposite ends of the auxiliary frame 30. A tilting mechanism for the auxiliary frame 30 may be mounted between the axes of trunnions 40 and 41, which as shown herein comprises a telescopic hydraulic jack 45 pivotally mounted to the main frame 23 at 46.

Figure 3:
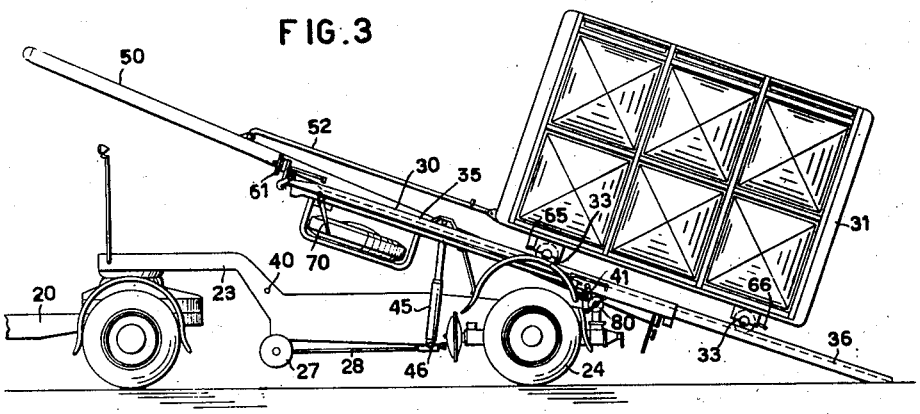
Fig. 3 is similar to Fig. 2 with the auxiliary frame tilted rearwardly in order to transfer the container to or from the ground.
Figure 4:
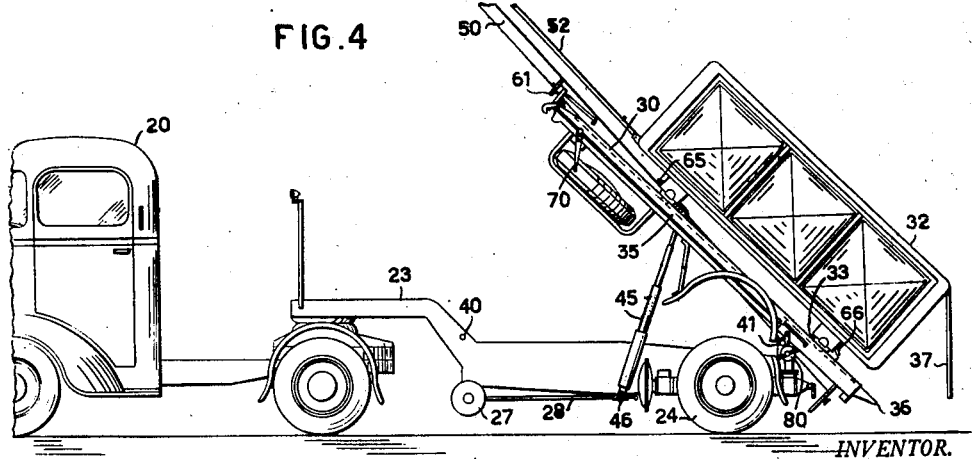
Fig. 4 is similar to Fig. 2 showing the auxiliary frame tilted rearwardly at a sufficiently high angle so that the contents of a container mounted thereon may be dumped or its contents removed without removing the container from the auxiliary frame.

A pushing and pulling mechanism or transfer device 50 may be pivotally mounted on the main frame and connected to the auxiliary frame 30 so that it may be tilted with the auxiliary frame in the rearwardly direction as shown in Figs. 3 and 4. This transfer device may comprise another hydraulic cylinder such as that shown in Van Doorne Dutch Patent 55,777 and shown schematically in the upper right portion of Fig. 10, and a connecting rod 52 for connecting it to container 31 or 32 so that these containers may be pushed or pulled onto or off of the tracks 35 of the auxiliary frame 30. When the container 31 or 32 is in its transporting position it may be fastened in that position by means of hooks 60 and adjustable universal hooks 61 (shown in detail in Fig. 8).

In this position shown in Fig. 1, the manual control device 70 for selectively fastening the tiltable auxiliary frame 30 to either one or both of the axes 40 or 41 is shown in its middle position wherein both the axes are hooked as shown in the full line position of the hook 71 shown in Fig. 15.

Figure 2:
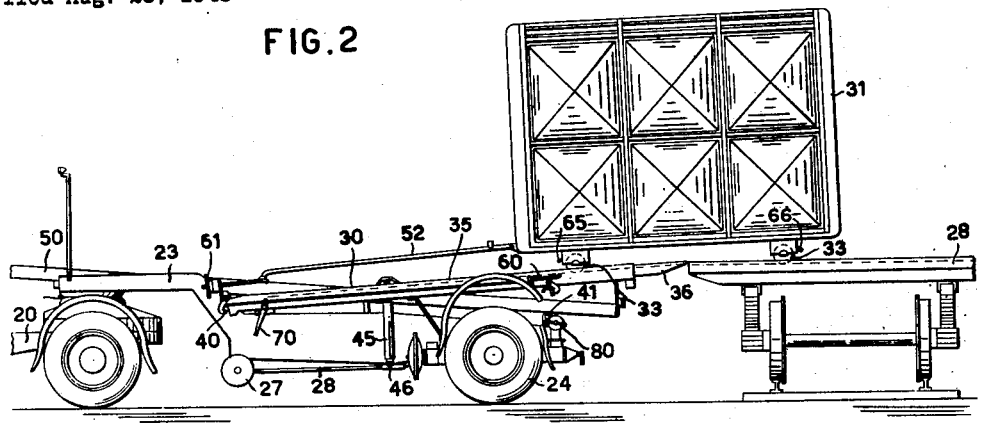
Fig. 2 is similar to Fig. 1 with a container carried on the auxiliary frame and with the auxiliary frame tilted forwardly for the transfer of the container to or from a railway car or other platform higher than the carrying position of the auxiliary frame.

If the auxiliary frame 30 is to be tilted forwardly about the forward axis of trunnions 40 as shown in Figs. 2 and 6, the manual control device or lever 70 is pulled forward so that the forward hooks 71 closely engage the trunnions 40 on each side of the main frame 23, as shown in position 72 in Fig. 15. This motion through link connections 73 and 74 (see Figs. 1, 5, 6, 7 and 9) simultaneously disengages the hooks 75 (corresponding to 71) from the trunnions 41 so that when the second manual control device 80 is operated to extend the piston 45, the auxiliary frame 30 will be tilted forwardly around the axis of trunnions 40 as shown in Figs. 2 and 6. The advantage of tilting the auxiliary frame 30 in this direction enables the vehicle to unload containers 31 from levels higher than that of the normal carrying position of the auxiliary frame shown in Fig. 1, such as from the floor of a railway car 28 as shown in Fig. 2, or the floor of a railway depot plateform of substantially the same height. In order to form a bridge when pushing or pulling the container, telescoping extensions 36 may be provided for each track 35 to engage the nearest edge of the platform or railroad car as shown in Fig. 2. The relative dimensions of the container with respect to that of an ordinary railway car would permit several such containers to be placed on one car, and hence the name of "LCL" for such containers.

When the lever 70 is pushed rearwardly as shown in Figs. 3, 4, 7 and 9, the hooks 75 fully engage the rear trunnions 41 through the link connections 73 and 74, and simultaneously hooks 71 disengage the lower edge of the trunnions 40, as shown in the dotted line position 76 in Fig. 15. Now when the second control device 80 is operated to extend the hydraulic mechanism 45, the auxiliary frame 30 is tilted rearwardly as shown in Figs. 3 and 4. If a container such as 31 or 32 is to be transferred to or from the ground level the extensions 36 of the rails 35 may be extended to touch the ground as shown in Fig. 3, so that the container may be easily pulled or pushed onto or off of the frame 30 solely by means of the transferring device 50.

Similarly, if a container such as 32 with a rearwardly opening end 37 is transported on the vehicle, the vehicle may act as a dump truck and dump the contents of the container directly as shown in the position of Fig. 4, by extending the mechanism 45 a greater distance than that shown in Figs. 3 and 7.

The second manual control device shown in detail in Figs. 9 to 14, 16 and 17, may comprise a lever with opposing handles 81 to which is attached the pointer 82, so that the control valve 88 (see Figs. 10–14) for the hydraulic mechanisms 45 and 50 may be selectively adjusted into any one of four positions, as follows; N, the neutral position in which no fluid pressure is applied to the cylinders of either of the devices 45 and 50 and the pump is connected to a fluid reservoir (see Fig. 10 or 11); A, the position in which the transfer mechanism 50 operates to push the container from the vehicle (see Fig. 12); B, the position in which the transfer mechanism 50 operates to pull the container onto the vehicle (see Fig. 13); and C, the position in which fluid pressure is supplied to the hydraulic tilting mechanism 45 to tilt the auxiliary frame 30 (see Fig. 14). After the lever 81 places the pointer into the position desired, a separate manual valve with handle 83 may be operated to regulate the amount of pressure and fluid to be admitted to the mechanism 45 or 50.

Figure 9:
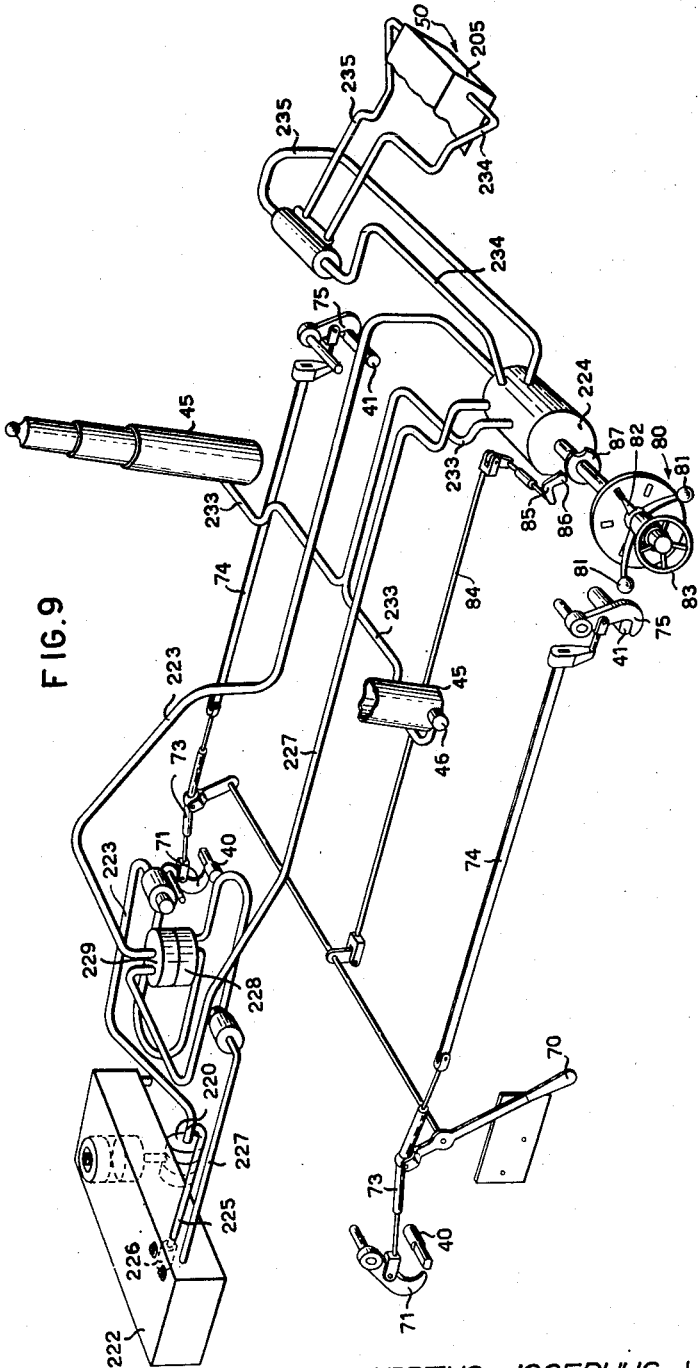
Fig. 9 is a schematic perspective view of a mechanical device or system for selectively locking the forward, the backward and both tilting motions of the auxiliary frame and its co-operation with a hydraulic device or system for selectively operating the tilting means of the auxiliary frame and the moving means of the container.

In connection with the operation of handle 81, there is provided a safety device more clearly shown in Figs. 9 and 17, which is operated with the motion of the first control handle 70 through the link 84 and cam lever 85 to engage or disengage its cam surface 86 with the cam 87 mounted to turn with the handle 81 for positioning the control valve 88. When the handle 81 is in its neutral position as shown in Figs. 16 and 17, and the axle locking device 70 is in its middle position as shown in Fig. 1, the control device 80 cannot be operated or turned until the lever 70 is placed in either its forward or backward position. Thus, when the tiltable platform is connected at both ends by hooks 71 and 75 to trunnions 40 and 41, respectively, so that it cannot be moved, the control valve 81 cannot be changed from its neutral position and fluid pressure cannot be aplied to either one of the mechanisms 45 or 50. Thus, before the valve 81 can be operated, the first control device or handle 70 must be moved to move the cam lever 85 and its cam surface 86 from cam 87. Once this occurs by motion of lever 70 in either direction as shown in Figs. 2, 3, 4, 6, 7 and 9, the lever 70 cannot be moved again into its middle or opposite position, until the control device 81 is again placed in its neutral position. However, once the lever 70 is operated to lock the first control device in either its forwardly or rearwardly tilting position, the control valve 88 may be set by handle 81 into any one of its four positions N, A, B, or C, (see Fig. 16) by the operation on handle 81, to provide for the proper tilting of the auxiliary frame 30 (in position C) and the extension and retraction of the transfer mechanism 50 (in positions A and B respectively), and then the replacement of the auxiliary frame into its container carrying position (in position N).

The transfer mechanism 50 as disclosed in Van Doorne Dutch Patent No. 55,777 comprises a double active hydraulic cylinder 201 (see Fig. 10) which is guided and slidably movable within the housing of said mechanism 50. Said cylinder 20 is movable along a stationary piston 202 connected with one end of said housing by a hollow piston rod 203 which comprises a central tube 204. The piston rod 203 is apertured near the piston 202 and the tube 204 extends through said piston. In this way different conduits communicate with the space within the cylinder 201 at each side of the piston 202. These separate conduits are connected to separate ends of a valve box 205 comprising a movable valve member 206 which is urged to its central position by springs 207 and 208.

Both ends of the cylinder 201 carry rotatable sprockets 209 and 210, respectively, around which sprockets a chain 211 is guided. This chain is fixedly secured by a connection 212 along its lower run to the housing of the mechanism 50, while its upper run is connected to a sliding member 213 which is guided through a longitudinal slot along the top of said housing and to which member 213 the above mentioned rod 52 is connected. It will be clear that by admitting hydraulic pressure through one of the conduits in connecting rod 203 to one or the other side of piston 202, the piston 201 will move in one or the other direction. Since the lower run of chain 211 is held stationary by its connection 212, the upper run and member 213 with rod 52 will be displaced over a distance twice as long as the displacement of cylinder 201, thereby multiplying the motion of the cylinder 201.

The hydraulic system schematically represented in Figs. 9 and 10 comprises a hydraulic pump 220 of any known suitable type connected with its suction side through a duct 221 to a fluid tank or reservoir 222, and with its pressure side through a duct 223 to the housing 224 of the above mentioned control valve 88. A bypass duct 225 connects duct 223 through a safety valve 226 to tank 222. The housing 224 is connected through a free duct 227 to tank 222. Ducts 223 and 227 extend through mutually rotatable members 228 and 229 arranged in the center of the fifth wheel 22 of the tractor 20 and the support 26 resting thereon.

By means of a handle 83 a valve 230 can be opened or closed, thus controlling the quantity of fluid supplied by pressure ducts 223 which is allowed to be freely recycled and returned through duct 227 to tank 222. By closing valve 230 to a greater or smaller extent more or less fluid is forced through a spring loaded valve 231 into a passage 232 formed in the housing 224.

The housing 224 is further connected by a duct 233 to both jacks 45 and through ducts 234 and 235 to opposite ends of valve box 205.

Figs. 11 to 14 show four different positions which the control valve 88 may take within the housing 224, which positions correspond with positions N, A, B and C, respectively, of handle 81 as stated above. In the neutral position of said valve 88 shown in Figs. 10 and 11, any pressure in passage 232 and jack 45 is allowed to return to the tank 222. Consequently said jack 45 cannot be extended, even if valve 230 is fully closed and the entire quantity of oil supplied by pressure duct 223 is fed into passage 232.

If it is desired to push the container off the auxiliary frame, handle 81 is placed in position A and valve 88 is thereby turned in the position schematically represented in Fig. 12. Oil or fluid pressure supplied through passage 232 is directed through the valve 88 to duct 234 to the transfer mechanism 50, displacing the valve member 206 therein against spring 207. Thereby the passages within tube 203 and around tube 204 (which in the released central position of valve member 206 are both closed) are opened, so that pressure is admitted in the space of cylinder 201 at the right hand side of piston 202. The cylinder 201 is thus forced to the right and so is the sliding member 213 with the connecting rod 52. Oil present in the left hand space of cylinder 201 is allowed to return to the tank 222 through tube 204, duct 235, a passage in valve member 88 (see Fig. 12) and return duct 227.

If on the other hand it is desired to pull the container upon the auxiliary frame, handle 81 is placed in the position B corresponding with the position of valve 88 shown in Fig. 13. Fluid pressure supplied through passage 232 is directed through duct 235 to valve member 206, which is displaced against spring 208, thereby connecting duct 235 with tube 204, so that fluid is forced into the space of cylinder 201 to the left of piston 202. Consequently, sliding member 213 and connecting rod 52 are moved to the left, pulling the container onto the auxiliary frame. The fluid in cylinder space to the right of piston 202 is released through piston rod 203, duct 234, a passage in valve 88 (see Fig. 13) and return duct 227.

It is remarked that if neither of ducts 234 and 235 supply pressure to valve box 205 and the valve member 206 is in its central position, no fluid can pass through tube 204 or through the space around said tube 204 inside the connecting rod tube 203, so that cylinder 201 is prevented from displacement in either direction, thus holding the container in its position (see Fig. 10 or 11).

In order to tilt the auxiliary frame after releasing trunnions 40 or 41 by means of lever 70, handle 81 is placed in position C so that valve 88 is placed in the position of Fig. 14. Fluid pressure supplied through passage 232 is directed through duct 233 to the jacks 45. If it is desired to lower the auxiliary frame again, handle 81 is placed in the position N corresponding with the position of valve 88 shown in Figs. 10 and 11, so that pressure in jacks 45 is released through return duct 227.

Referring now specifically to Fig. 8, there is shown in detail the universally adjustable hook 61 for holding the containers 31 and 32 in their vehicle carrying position on the auxiliary frame 30. The frame 30 may be provided with an upwardly extending bracket 38 carrying hollow sleeve or boss 90, through which sleeve extends a rod 62 threaded at one end at 63 and provided with a hook 64 at the other. On the threaded portion 63 is mounted an internally threaded sleeve, nut or hub 100 carrying a hand wheel 101, a flange 102, and a guiding extension 103. This extension 103 fits inside the sleeve 90 connected to the auxiliary frame 30, and together with the flange 102 provides a universal ball and socket type joint connection between the hook 61 and the frame 30. This ball and socket type joint comprises two spherical surfaces 104 and 105 on sleeve 100, which have the same center of curvature 106, for radii 108 and 109 of said surfaces, respectively. These surfaces are respectively concave and convex engaging surfaces on the flange 102 and sleeve extension 103. Cooperating with these surfaces are annular end of sleeve 90 having a convex spherical surface of radius 108 against which the surface 104 of flange 102 engages, and the internal cylindrical surface 91 of sleeve 90 having a radius 109 and against which the spherical surface 105 of sleeve extension 103 engages. The purpose of the extension 103 and its bearing surface 105 is to protect the threads 63 from being damaged by contact with the sleeve 90, when the hook rod 62 is in a limiting angular position. In order to maintain the sleeve 100 in engagement with the sleeve 90, there may be provided a spring 120 around the rod 62 which presses between washer 121 fixedly mounted to rod 62 and a loose washer 122 which engages the end of the sleeve 90 opposite from that engaged by the flange 102. The outer threaded end of the bar 62 may be provided with a fixed flange 125 to prevent the threaded sleeve 100 from being removed from the rod 62.

This adjustable hook mechanism 61, thus permits the hook to be extended and retracted a sufficient distance to engage its co-operating hook-eyes 65 (see Figs. 2, 3 and 4) mounted on containers 31 and 32, and then be tightened in these hook-eyes 65 to rigidly anchor the containers on to the auxiliary frame 30, as well as tighten the connection of opposing hooks 60 (see Figs. 1, 2, 6 and 7) in their co-operating hook-eyes 66 near the other end of the containers. The universal joint mounting for the hook 61 also provides for any discrepancy which may occur in the relative location of these hook-eyes on different containers.

Although the present invention has been specifically described in connection with a tractor and semi-trailer the same device may be applied to a full trailer or a complete truck without departing from the scope of this invention. Furthermore, although a hydraulic mechanism has been shown for controlling the tilting and transferring mechanisms, either one or both of these mechanisms may be operated by other types of power means employed on such vehicles.

While there is described above the principles of this invention is connection with specific apparatus, it is to be clearly understood that this description is made only by way of example and not as a limitation to the scope of this invention.

What is claimed is:

1. In a vehicle for transporting a container, said vehicle having a main frame, an auxiliary frame mounted on said main frame to carry said container, means to tilt said auxiliary frame forwardly and backwardly, and means to move said container onto and off of said auxiliary frame, the improvement comprising means to lock said auxiliary frame in container carrying position and means cooperating with said locking means to prevent the operation of both said moving means and said tilting means when said auxiliary frame is in its container transporting position.

2. The vehicle of claim 1 wherein said locking means includes a first manually adjustable control device having means for selectively locking the forward, the backward and both tilting motions of said auxiliary frame.

3. The vehicle of claim 2 wherein said locking means includes a second manually adjustable control device for selectively operating said tilting means and said moving means, and means for preventing the operation of said second device when said first manually adjustable control device locks both the tilting motions of said auxiliary frame.

4. The vehicle of claim 3 wherein said second manual device comprises means to control the amount of motion of said tilting means and said moving means.

5. In a vehicle for transporting a container, said vehicle having a main frame, an auxiliary frame mounted on said main frame to carry said container, a first hydraulic motor means to tilt said auxiliary frame forwardly and backwardly, a second hydraulic motor means to move said container onto and off of said auxiliary frame, the improvement comprising a first control means to selectively lock the forward, the backward and both tilting motions of said auxiliary frame, a second control means to selectively operate both said hydraulic motor means, and locking means to prevent the operation of said second control means when said auxiliary frame is in its container carrying position and said first control means locks both the tilting motions of said auxiliary frame.

6. The vehicle of claim 5 wherein said locking means comprises a lever cam, means to operate said lever cam by the motion of said first control means, and a cam engaging surface connected to said second control means which prevents the operation of said second control means when said cam is in engagement therewith.

7. The vehicle of claim 5 wherein said second control means includes a hydraulic valve having four different positions corresponding respectively to inoperation, operation of said second hydraulic motor means in one direction, operation of said second hydraulic means in the other direction, and operation of said first hydraulic motor means.

8. The vehicle of claim 5 wherein said first control means comprises pivoted hook means and lever means to operate said hook means to completely lock, partly lock and unlock the forward tilting motion and simultaneously and respectively to unlock, partially lock and completely lock the rearward tilting motion and wherein said locking means operates in the partially locked position of said hook means.

9. In a vehicle for transporting a container, said vehicle having a main frame, two parallel axle means fixedly mounted on said main frame, an auxiliary frame mounted on said main frame to carry said container, means to tilt said auxiliary frame alternately about either and neither of said axle means, and means to move said container onto and off of said auxiliary frame, the improvement comprising a control means to selectively lock said auxiliary frame to the forward, the backward, and both axle means on said main frame, and means to lock said moving means and said tilting means when said auxiliary frame is in its container transporting position and said control means locks said auxiliary frame to both said axle means.

10. The vehicle of claim 9 wherein said control means comprises separate hook means, a common link means connecting said hook means, and means to operate said common link means to completely engage, partly engage and disengage the forward axle means and simultaneously and respectively to disengage, partially engage, and completely engage the rearward axle means.

11. The vehicle of claim 10 wherein said common link means includes means to lock said moving means and said tilting means when said hooks are in their partial engagement positions with both of said axle means.

12. In a vehicle for transporting a container, said vehicle having a main frame, an auxiliary frame tiltably mounted on said frame to carry said container, means to tilt said auxiliary frame forwardly and backwardly, and means to move said container onto and off of said auxiliary frame, the improvement comprising means to lock said auxiliary frame in container carrying position and means cooperating with said locking means to prevent the operation of both said moving means and said tilting means when said auxiliary frame is in its container transporting position, and additional means to fasten said container in position on said auxiliary frame.

13. The vehicle of claim 12 wherein said fastening means comprises a ball and socket type support for a longitudinally adjustable hook to engage said container, said support being mounted on said auxiliary frame.

14. The vehicle of claim 13 wherein said fastening means includes manually operated screw means to move said hook into and out of said ball and socket support for engagement and disengagement with said container, and for tightening the fastening of said container onto said auxiliary frame.

15. A fastening means comprising a cylindrical support, a threaded rod extending through said support, a hook on said rod, means to thread said rod through said support to extend and retract said hook, and ball and socket joint means between said threading means and said support to permit angular movement of said rod with respect to the axis of cylindrical support, said ball and socket means comprising two separate spherical engaging surfaces of different radii and the same center of curvature, located between said threading means and said support.

16. The fastening means of claim 14 wherein said ball and socket means comprises two separate spherical engaging surfaces of different radii and the same center of curvature, located between said threading means and said support.

HUBERTUS JOSEPHUS van DOORNE.

REFERENCES CITED

The following references are of record in the file of this patent:

UNITED STATES PATENTS

| Number | Name | Date |
|---|---|---|
| 1,821,327 | Scott | Sept. 1, 1931 |
| 1,883,538 | Bywater | Oct. 18, 1932 |
| 1,910,398 | Ludington | May 23, 1933 |
| 2,114,157 | Towson | Apr. 12, 1938 |
| 2,132,612 | Faries | Oct. 11, 1938 |
| 2,251,293 | Schwartz et al. | Aug. 5, 1941 |
| 2,282,352 | Fitch | May 12, 1942 |

FOREIGN PATENTS

| Number | Country | Date |
|---|---|---|
| 334,632 | Great Britain | Sept. 11, 1930 |
| 332,910 | Italy | Dec. 11, 1935 |
| 50,510 | Holland | May 16, 1941 |